(12) United States Patent
Lawall et al.

(10) Patent No.: US 7,478,860 B2
(45) Date of Patent: Jan. 20, 2009

(54) VEHICLE SEAT ASSEMBLY

(75) Inventors: Jennifer P. Lawall, Waterford, MI (US); Diane K. McQueen, Leonard, MI (US); Steven E. Morris, Fair Haven, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/749,766

(22) Filed: May 17, 2007

(65) Prior Publication Data
US 2008/0284195 A1 Nov. 20, 2008

(51) Int. Cl.
*B60N 2/02* (2006.01)
(52) U.S. Cl. .................................................. 296/65.01
(58) Field of Classification Search .................. 296/63, 296/65.01, 65.05, 65.08, 65.16, 65.17, 65.18; 297/61, 391, 408, 410; 403/325
See application file for complete search history.

(56) References Cited

U.S. PATENT DOCUMENTS

| | | | |
|---|---|---|---|
| 5,669,668 A | 9/1997 | Leuchtmann | |
| 5,681,079 A | 10/1997 | Robinson | |
| 5,823,619 A | 10/1998 | Heilig et al. | |
| 6,705,658 B2 * | 3/2004 | Jach et al. | 296/65.09 |
| 6,779,839 B2 | 8/2004 | Andreasson et al. | |
| 6,860,564 B2 * | 3/2005 | Reed et al. | 297/61 |
| 7,059,681 B2 * | 6/2006 | Kubo | 297/410 |
| 7,118,171 B2 | 10/2006 | Fowler et al. | |
| 7,201,437 B2 * | 4/2007 | Freijy | 297/61 |
| 7,258,400 B2 * | 8/2007 | Yamada | 297/378.12 |
| 7,344,189 B2 * | 3/2008 | Reed et al. | 297/61 |

* cited by examiner

Primary Examiner—H Gutman

(57) ABSTRACT

A vehicle includes a seat assembly and a floor. The seat assembly includes a lower seat member operatively connected to the floor, a seatback member operatively connected to the lower seat member, and a head restraint operatively connected to the seatback member. The seat assembly is characterized by an occupiable configuration and a stowed configuration. The seat assembly is configured such that movement of the seat assembly from its occupiable configuration to its stowed configuration causes the head restraint to rotate in a first direction and then a second direction.

10 Claims, 3 Drawing Sheets

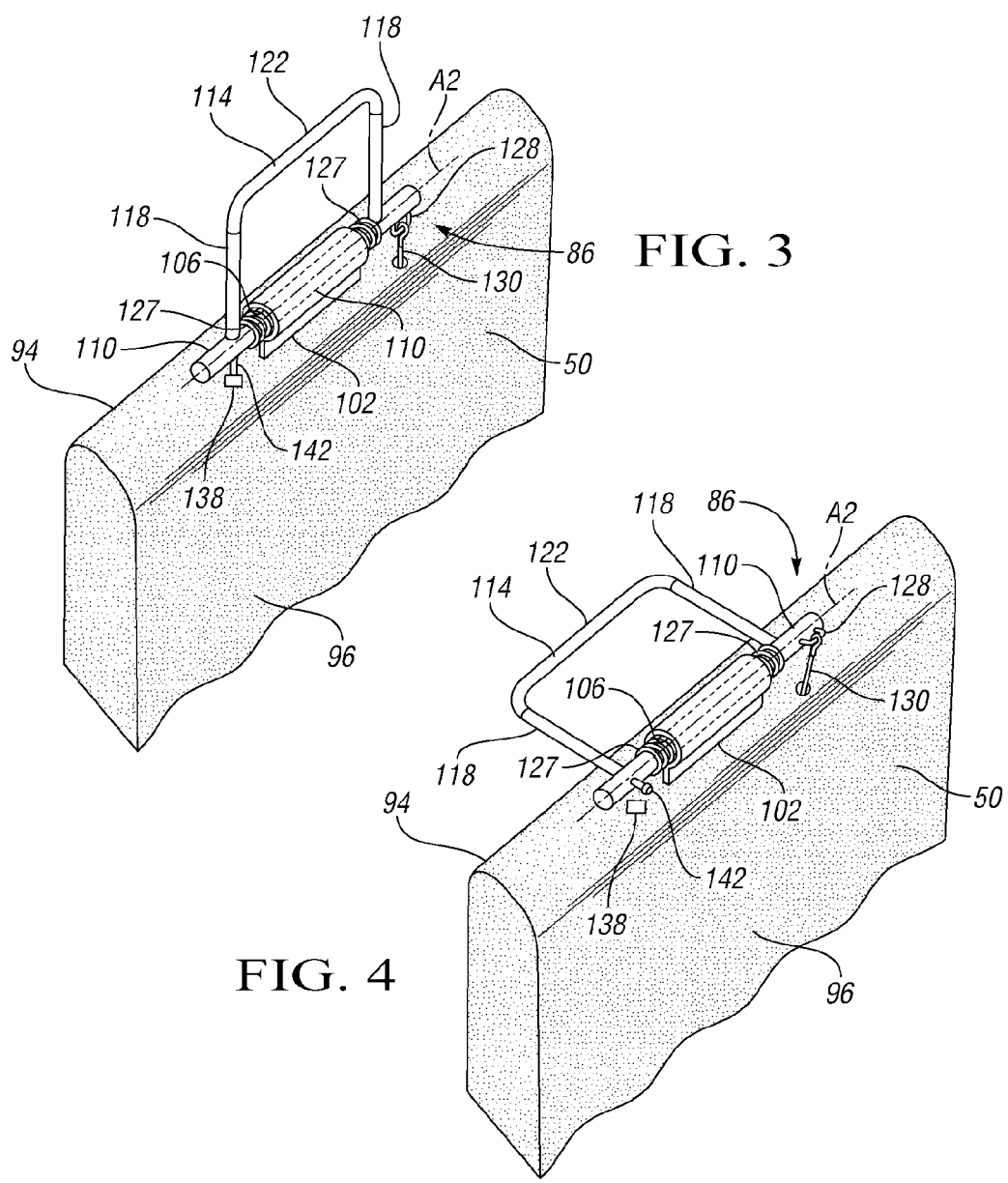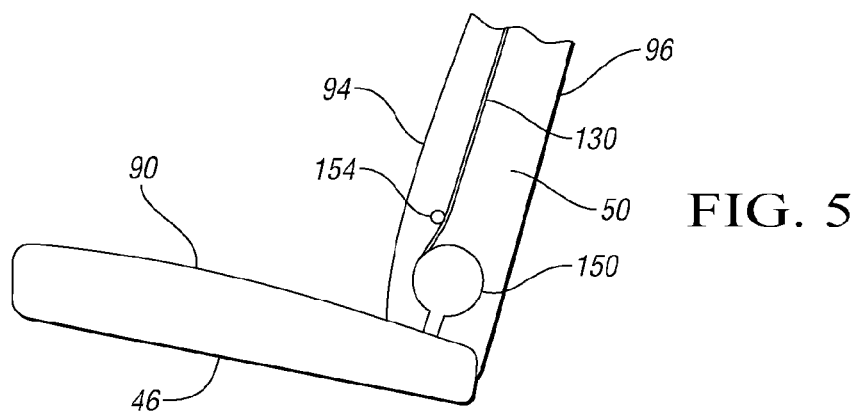

VEHICLE SEAT ASSEMBLY

TECHNICAL FIELD

This invention relates to folding seats having rotatable head restraints.

BACKGROUND OF THE INVENTION

Vehicles such as minivans and sport utility vehicles often include a cargo area at the rear of the vehicle body. Some vehicles include seats adjacent the cargo area that are removable from the vehicle to expand the cargo area. Other vehicles include seats having seatback members that are rotatable from an upright, occupiable position to a generally horizontal position to reduce the height of the seats and thereby expand the cargo area. Prior art seats typically include a head restraint at the top of the seatback member.

SUMMARY OF THE INVENTION

A vehicle is provided that includes a floor and a seat assembly. The seat assembly includes a lower seat member, a seatback member, and a head restraint. The lower seat member is operatively connected to the floor and is selectively movable between an elevated position and a lowered position with respect to the floor. The seatback member is operatively connected to the lower seat member and is selectively rotatable with respect to the lower seat member between a generally upright position and a generally horizontal position. The head restraint is operatively connected to the seatback member and is selectively rotatable with respect to the seatback member between an extended position and a folded position.

The seat assembly is configured such that the head restraint is in its folded position when the seatback member is between its generally upright and generally horizontal positions, and the head restraint is rotated from its folded position toward its extended position when the lower seat member is moved to its lowered position with the seatback member in its generally horizontal position.

The movement of the head restraint to its folded position when the seatback member is between its generally upright and horizontal positions increases the clearance between the head restraint and any object in the vehicle, such as another seat assembly, that may interfere with the head restraint during movement of the seatback to its generally horizontal position. The rotation of the head restraint from its folded position toward its extended position enables the seat assembly provided herein to have a smaller height when stowed than prior art seat assemblies, thereby providing improved packaging of the stowed seat assembly, such as within a tub or other cavity in a vehicle body floor.

A corresponding method of moving a vehicle seat from an occupiable configuration to a stowed configuration is also provided. The method includes rotating a head restraint in a first direction from an extended position to a folded position; rotating a seatback member toward a generally horizontal position with the head restraint in the folded position; and subsequent to rotating the seatback member, rotating the head restraint in a second direction opposite the first direction with the seatback member in the generally horizontal position.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic, perspective view of the head restraint of FIGS. 1 and 2 in an extended position relative to the seatback member;

FIG. 4 is a schematic, perspective view of the head restraint of FIGS. 1-3 in a folded position with respect to the seatback member;

FIG. 5 is a schematic, cross-sectional side view of a portion of the rear seat assembly of FIG. 1;

DESCRIPTION OF THE PREFERRED EMBODIMENTS

Figure 1:
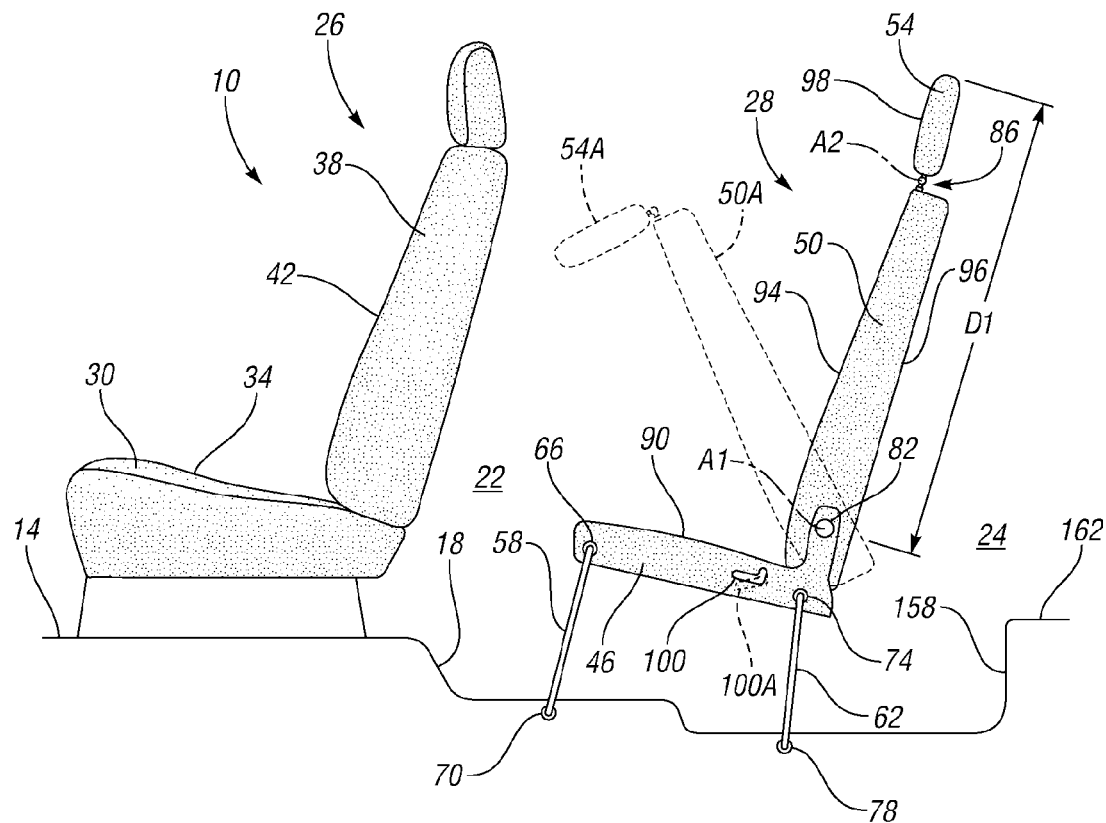
FIG. 1 is a schematic, side view of a vehicle including a rear seat assembly having a lower seat member, a seatback member, and a head restraint in an occupiable configuration.

Referring to FIG. 1, a vehicle 10 includes a vehicle body 14. The vehicle body 14 includes a floor 18 that partially defines an interior compartment having a passenger area 22 and a cargo area 24. Two seat assemblies 26, 28 are mounted with respect to the floor 18 within the passenger area 22. Front seat assembly 26 is positioned within the vehicle body 14 forward of rear seat assembly 28. Rear seat assembly 28 is positioned within the vehicle body 14 immediately forward of the cargo area 24.

Seat assembly 26 includes a lower seat member 30 that defines a generally horizontal surface 34 for supporting an occupant (not shown). Seat assembly 26 also includes a seatback member 38 that defines a generally vertical surface 42 for supporting the back of an occupant. Seat assembly 28 also includes a lower seat member 46, a seatback member 50, and a head restraint 54.

The lower seat member 46 is supported above the floor 18 by a first link 58 and a second link 62. The first link 58 is pivotably connected to the lower seat member 46 at one end by pivot 66 and is pivotably connected to the floor 18 at the other end by pivot 70. The second link 62 is pivotably connected to the lower seat member 46 at one end by pivot 74 and is pivotably connected to the floor at the other end by pivot 78. A corresponding pair of links (not shown) is on the opposite side of the lower seat member 46 from links 58, 62 and operatively interconnects the lower seat member 46 and the floor 18 in a manner similar to links 58, 62. The links 58, 62 are exemplary; those skilled in the art will recognize a variety of devices, techniques, etc., that may be employed within the scope of the claimed invention for articulating the seat assembly 28 down to the floor 18.

Figure 6:
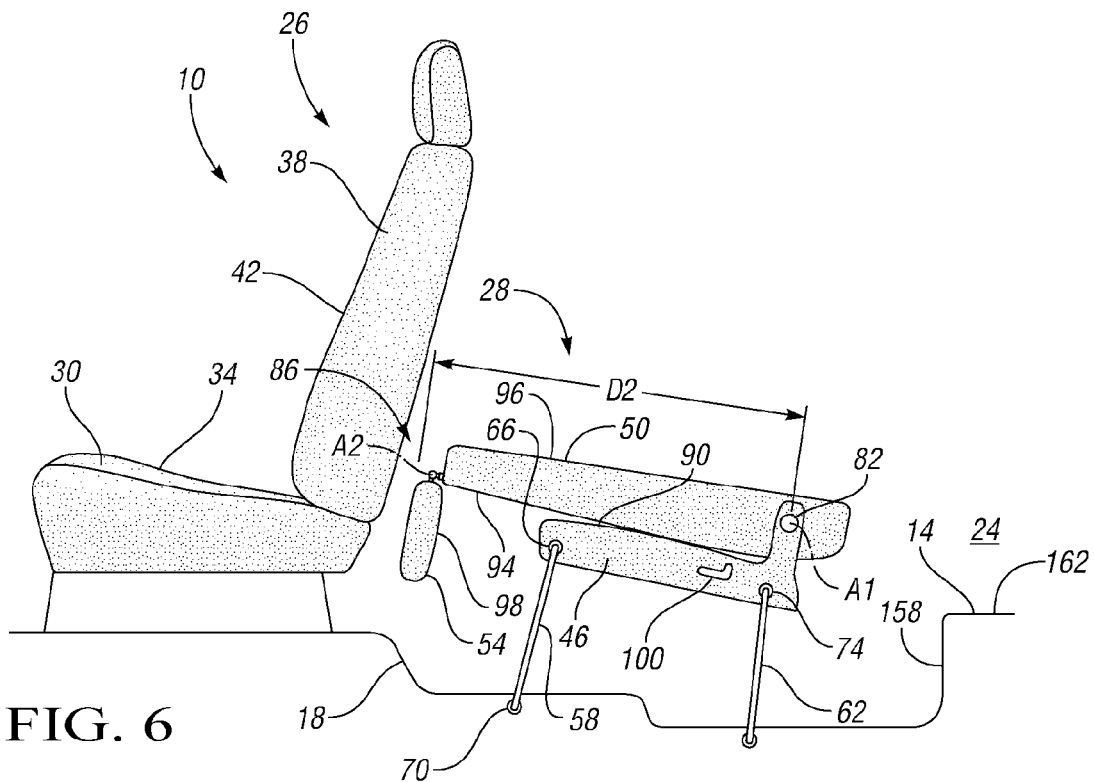
FIG. 6 is a schematic, side view of the vehicle of FIG. 1 with the rear seat assembly in a progressive, intermediate configuration.
Figure 7:
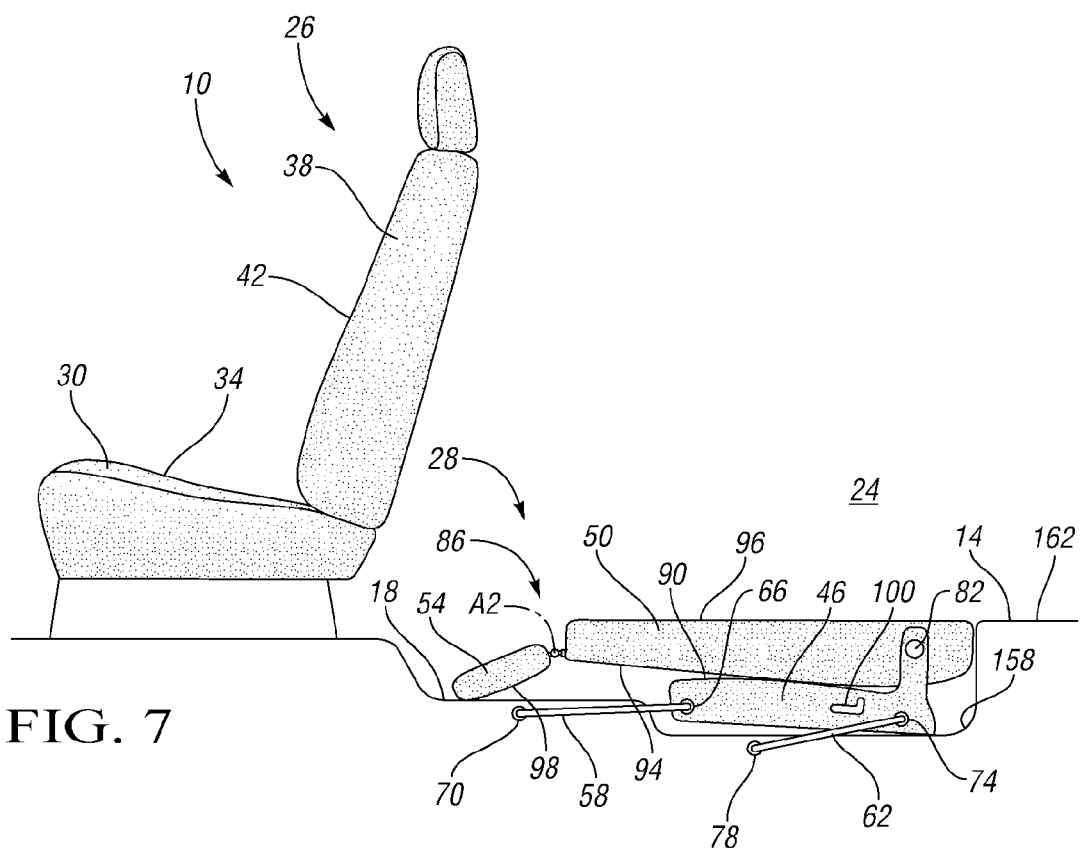
FIG. 7 is a schematic, side view of the vehicle of FIGS. 1 and 6 with the rear seat assembly in a stowed configuration.

Hinge 82 is mounted with respect to the lower seat member 46 and operatively connects the seatback member 50 to the lower seat member 46 such that the seatback member 50 is selectively rotatable with respect to the lower seat member 46 about axis A1. More specifically, the seatback member 50 is selectively rotatable with respect to the lower seat member 46 between a generally upright position, as shown in FIG. 1, and a generally horizontal position, as shown in FIGS. 6 and 7.

The head restraint 54 is operatively connected to the seatback member 50 by pivot assembly 86 for rotation with respect to the seatback member 50 about axis A2. More specifically, the head restraint 54 is selectively rotatable with respect to the seatback member 50 between an extended position, as shown in FIGS. 1-3, and a folded position, as shown in FIGS. 4 and 6.

The seat assembly 28 is depicted in FIG. 1 in an occupiable configuration in which the seat assembly 28 is arranged for supporting an occupant (not shown). More specifically, the lower seat member 46 is in an elevated position with respect to the floor 18. Surface 90 of the lower seat member 46 is generally horizontally oriented and upwardly facing for supporting the occupant. The seatback member 50 is generally upright so that surface 94 of the seatback member 50 is generally vertical for supporting the back of the occupant. Seatback member 50 also defines surface 96, which is generally vertically oriented and which generally faces the cargo area 24. The head restraint 54 is in its extended position in which surface 98 of the head restraint 54 generally faces the same direction as surface 94. When the head restraint 54 is in its extended position as shown, the head restraint 54 extends a distance D1 from axis A1.

A latch (shown at 138 in FIGS. 2-4) releasably interconnects the head restraint 54 and the seatback member 50 to retain the head restraint 54 in its extended position. A latch (not shown) releasably interconnects the seatback member 50 and the lower seat member 46 to retain the seatback member 50 in its generally upright position. At least one latch (not shown) prevents rotation of links 58, 62 with respect to the lower seat member 46 and the floor 18, thereby to retain the lower seat member 46 in its elevated position. A release handle 100 is pivotably connected to the lower seat member 46 and is movable by a vehicle user to release the latch that retains the seatback member 50 in its generally upright position.

Figure 2:
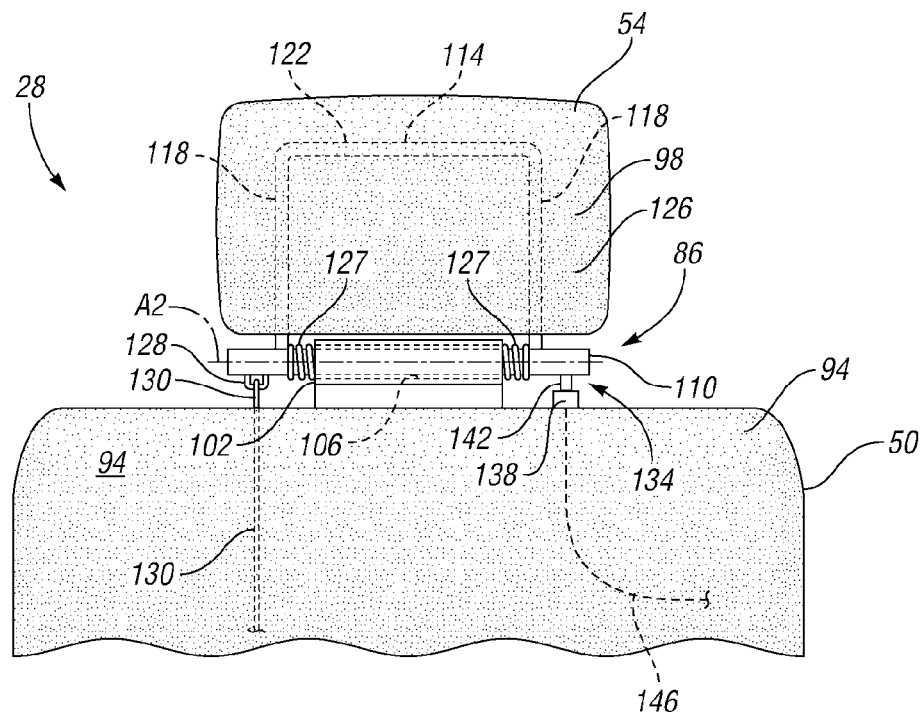
FIG. 2 is a schematic, front view of part of the seatback member and the head restraint of the rear seat assembly of FIG. 1.

Referring to FIGS. 2-4, wherein like reference numbers refer to like components from FIG. 1, the pivot assembly 86 includes a sleeve member 102 mounted to the seatback member 50. The member 102 in the embodiment depicted defines a cylindrical cavity 106 having axis A2 as its centerline. The pivot assembly 86 also includes a cylindrical shaft 110 that extends through the cylindrical cavity 106, and is rotatable therein about axis A2 with respect to member 102, and, correspondingly, with respect to the seatback member 50.

The head restraint 54 includes a frame 114, which, in the embodiment depicted, includes two posts 118 that are mounted to the shaft 110 on opposite sides of member 102 and that extend radially outward from the shaft 110. Accordingly, the head restraint 54 is mounted to the shaft 110 for rotation therewith about axis A2. The frame 114 in the embodiment depicted further includes a cross member 122 that interconnects the posts 118. A head restraint housing (not shown) may be operatively connected to the shaft 110, as understood by those skilled in the art. The head restraint 54 further includes a flexible cover 126 that defines surface 98, and padding (not shown), such as a foam cushion, that is disposed between the cover 126 and the frame 114. The padding and the cover 126 encapsulate most of the frame 114 so as to be operatively connected thereto.

The pivot assembly 86 also includes springs 127 that operatively interconnect the shaft 110 and the member 102 to bias the head restraint 54 into its folded position. More specifically, the springs 127 urge the shaft 110 to rotate with respect to the seatback member 50 about axis A2 until the head restraint 54 is in its folded position. Springs 127 in the embodiment depicted are torsion springs; however, those skilled in the art will recognize a variety of springs that may be employed within the scope of the claimed invention to bias the head restraint 54 into its folded position, such as coil springs, spiral springs, etc.

The pivot assembly 86 also includes a U-shaped member 128 mounted to the shaft 110 and protruding radially therefrom. The U-shaped member 128 is positioned on the shaft 110 so that the member 128 projects radially from the shaft 110 toward the seatback member 50 when the head restraint 54 is in its extended position. One end of a flexible member, such as cable 130, is connected to the member 128, and extends into the seatback member 50. The cable 130 is configured to be taut, i.e., subjected to tensile stress, when the seatback member 50 is in its generally upright position; the cable 130 is configured to be loose when the seatback member 50 is not in its generally upright position. When the cable 130 is pulled taut as the seatback member 50 is rotated to its generally upright position, it pulls the U-shaped member 128 adjacent the seatback member 50, and thereby rotates the head restraint 54 into its extended position, as shown in FIGS. 2 and 3.

A latch assembly 134 includes a latch 138 mounted to the seatback member 50 and a striker 142 mounted to the shaft 110. The striker 142 is sufficiently positioned on the shaft 110 to engage the latch 138 when the head restraint 54 is in its extended position with respect to the seatback member 50, thereby to prevent the shaft 110, and therefore the head restraint 54, from rotating with respect to member 102 and, correspondingly, the seatback member 50. Thus, the latch 138, when engaged with the striker 142, counteracts the bias of the springs 127 and maintains the head restraint 54 in its extended position, as shown in FIGS. 2 and 3. A cable 146 operatively connects the latch 138 to the handle (shown at 100 in FIG. 1) such that the handle is operative to disengage the latch 138. The seat assembly 28 is characterized by the absence of a latch that locks the head restraint 54 in its folded position.

When the latch 138 is released and the cable 130 is loose, the springs 127 cause shaft 110 and frame 114 to rotate until the head restraint 54 is in its folded position, as shown in FIG. 4. Referring to FIG. 5, wherein like reference numbers refer to like components from FIGS. 1-4, the cable 130 extends through the seatback member 50, and the end of the cable 130 opposite the U-shaped member (shown at 128 in FIGS. 2-4) is mounted to a bracket 150. Bracket 150 is mounted to the lower seat member 46. Accordingly, the seatback member 50 is rotatable with respect to the bracket 150. The bracket 150 in the embodiment depicted is characterized by a curved outer surface.

A pulley 154 is mounted within the seatback member 50, and is sufficiently positioned to contact the cable 130 as the seatback member 50 is moved to its generally upright position, thereby causing the cable 130 to wrap along the curved surface of bracket 150, which causes the end of the cable 130 that is attached to the U-shaped member to move downward, which in turn causes the U-shaped member to rotate until the head restraint 54 is in its extended position. Accordingly, the seat assembly 28 is configured such that movement of the seatback member 50 into its generally upright position causes the head restraint 54 to move to its extended position.

Referring again to FIG. 1, the release handle 100 is selectively pivotable to the position shown at 100A, thereby to release the latch that interconnects the seatback member 50 and the lower seat member 46 so that the seatback member 50 is rotatable from its generally upright position, through an intermediate position shown at 50A, to the generally horizontal position shown in FIGS. 6 and 7. Movement of the handle 100 to the position shown at 100A also causes the latch (shown at 138 in FIGS. 2-4) to disengage the striker (shown at 142 in FIGS. 2-4) so that the latch 138 does not restrict the movement of the head restraint 54 from its extended position. A rotatable handle 100 is employed in the embodiment depicted; however, those skilled in the art will recognize a variety of mechanisms, techniques, etc. that may be employed within the scope of the claimed invention to release latches and thereby initiate the movement of a seat assembly between its various configurations.

As the seatback member 50 is rotated from its generally upright position to the intermediate position shown at 50A, the cable (shown at 130 in FIGS. 2-4) becomes sufficiently loose so that the cable does not restrict the movement of the head restraint 54 from its extended position. Accordingly, the springs (shown at 127 in FIGS. 2-4) cause the head restraint to rotate in a first direction about axis A2 to its folded position, as shown at 54A, when the seatback member 50A is in the intermediate position. Accordingly, movement of the seatback member 50 from its generally upright position to its generally horizontal position causes the head restraint 54 to move automatically to the folded position. The springs 127 maintain the head restraint in its folded position relative to the seatback member 50 during movement of the seatback member 50 from the intermediate position to its generally horizontal position.

Referring to FIG. 6, wherein like reference numbers refer to like components from FIGS. 1-5, the seat assembly 28 is depicted in an intermediate configuration between the occupiable configuration of FIG. 1 and the stowed configuration of FIG. 7. The seatback member 50 is in its generally horizontal position, the head restraint 54 is in its folded position, and the lower seat member 46 is maintained in its elevated position. When the head restraint 54 is in its folded position, it extends a distance D2 from axis of rotation A1. Distance D2 is less than distance D1; accordingly, the movement of the head restraint 54 into its folded position avoids physical interference between the head restraint 54 and the seatback member 38 of the front seat assembly 26 as the seatback member 50 is rotated to its generally horizontal position. In the embodiment depicted, when seatback member 50 is in its generally horizontal position, surface 94 faces generally downward (in the direction of the floor 18) and is in juxtaposition with surface 90 of the lower seat member 46; surface 96 faces generally upward and is generally horizontally oriented.

The latch or latches that prevent the rotation of links 58, 62 with respect to the lower seat member 46 and the floor 18 may then be released so that the lower seat member 46 is movable from its elevated position to a lowered position with respect to the floor 18, as shown in FIG. 7. Referring to FIG. 7, wherein like reference numbers refer to like components from FIGS. 1-6, the seat assembly 28 is shown in its stowed configuration. The seatback member 50 and the head restraint 54 are both operatively connected to the lower seat member 46, and, accordingly, when the lower seat member 46 is moved to its lowered position, the seatback member 50 and the head restraint 54 are also moved lower in the vehicle body 14.

In the stowed configuration, the height of the seat assembly 28 is significantly lower than the height of the seat assembly 28 in its occupiable configuration, and thus the cargo area 24 is expanded. That is, when the seat assembly 28 is in its stowed configuration, cargo (not shown) may occupy space that was formerly occupied by the seat assembly 28 in its occupiable position. In the embodiment depicted, the floor 18 defines a concavity 158 into which the seat is fittable in its stowed configuration such that surface 96 of the seatback member 50 is at approximately the same height within the vehicle body 14 as the portion 162 of the floor 18 that defines the cargo area 24. Cargo may be placed on or across the generally horizontal surface 96.

The seat assembly 28 includes a contact member, which, in the embodiment depicted, is the floor 18. As the lower seat member 46 is moved to its lowered position, the head restraint 54 contacts the floor 18; physical part interference between the floor and the head restraint 54 causes the head restraint 54 to rotate relative to the seatback member 50 in a second direction about axis A2 from its folded position toward its extended position. In the embodiment depicted, the head restraint 54 is in an intermediate position between its extended and folded positions when the seat assembly 28 is in its stowed configuration, as shown in FIG. 7. Physical part interference between the floor 18 and the head restraint 54 counteracts the springs (shown at 127 in FIGS. 2-4) and prevents rotation of the head restraint 54 into its folded position. Thus, movement of the lower seat member 46 to its lowered position with the seatback member 50 in its generally horizontal position causes the automatic rotation of the head restraint 54 from its folded position toward its extended position. Latches (not shown) preferably lock the lower seat member 46 into its lowered position and the seatback member in its generally horizontal position to keep the head restraint in contact with the floor 18.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   a floor;
   a seat assembly including a lower seat member being operatively connected to the floor and being selectively movable between an elevated position and a lowered position with respect to the floor, a seatback member being operatively connected to the lower seat member and being selectively rotatable with respect to the lower seat member between a generally upright position and a generally horizontal position, and a head restraint being operatively connected to the seatback member and being selectively rotatable with respect to the seatback member between an extended position and a folded position; and
   wherein the seat assembly is configured such that the head restraint is automatically rotated to its folded position when the seatback member is between its generally upright and generally horizontal positions, and the head restraint is automatically rotated from its folded position toward its extended position when the lower seat member is moved to its lowered position with the seatback member in its generally horizontal position.

2. The seat assembly of claim 1, further comprising a spring biasing the head restraint into its folded position.

3. The seat assembly of claim 1, wherein the seat assembly is configured such that the head restraint is in its extended position when the seatback member is in its generally upright position.

4. The seat assembly of claim 1, further comprising structure sufficiently positioned to contact the head restraint and rotate the head restraint away from its folded position when the lower seat member is moved to its lowered position.

5. The seat assembly of claim 4, wherein the structure is the floor.

6. The seat assembly of claim 1, wherein the seatback member is rotatable with respect to the lower seat member about an axis of rotation; wherein the head restraint extends farther from the axis of rotation in its extended position than its folded position.

7. A method of moving a vehicle seat from an occupiable configuration to a stowed configuration, the method comprising:
- rotating a head restraint in a first direction from an extended position to a folded position;
- rotating the seatback member toward a generally horizontal position with the head restraint in the folded position; and
- subsequent to said rotating the seatback member, rotating the head restraint in a second direction opposite the first direction with the seatback member in the generally horizontal position.

8. The method of claim 7, further comprising moving the seatback member from its generally horizontal position to a generally upright position; and causing the head restraint to rotate to its extended position.

9. The method of claim 8, further comprising latching the head restraint in its extended position.

10. A vehicle comprising:
- a floor;
- a contact member;
- a seat assembly including a lower seat member, a seatback member, a head restraint, and a spring;
- said lower seat member being operatively connected to the floor and selectively movable between an elevated position and a lowered position;
- said seatback member being operatively connected to the lower seat member and selectively rotatable with respect to the lower seat member between a generally upright position and a generally horizontal position;
- said head restraint being operatively connected to the seatback member and being selectively rotatable with respect to the seatback member between an extended position and a folded position;
- said spring biasing the head restraint into its folded position;
- wherein the seat assembly is selectively movable between
  - an occupiable configuration in which the lower seat member is in its elevated position, the seatback member is in its generally upright position, and the head restraint is in its extended position,
  - an intermediate configuration in which the lower seat member is in its elevated position, the seatback member is in its generally horizontal position, and the head restraint is in its folded position, and
  - a stowed configuration in which the lower seat member is in its lowered position, the seatback member is in its generally horizontal position, and the head restraint contacts the contact member, said contact member being sufficiently positioned to rotate the head restraint away from its folded position as the seat assembly is moved to its stowed configuration.

* * * * *